US012775064B2

(12) United States Patent
Singh et al.

(10) Patent No.: US 12,775,064 B2
(45) Date of Patent: Oct. 27, 2026

(54) METHODS AND APPARATUS TO REDUCE POWER CONSUMPTION OF RADAR MEMORY OPERATIONS

(71) Applicant: Texas Instruments Incorporated, Dallas, TX (US)

(72) Inventors: Jasbir Singh, Bengaluru (IN); Premkumar Seetharaman, Bangalore (IN); Sandeep Rao, Bangalore (IN); Rashmi Sachan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 342 days.

(21) Appl. No.: 18/391,109

(22) Filed: Dec. 20, 2023

(65) Prior Publication Data

US 2025/0004100 A1 Jan. 2, 2025

(30) Foreign Application Priority Data

Jun. 27, 2023 (IN) ............................ 202341042929

(51) Int. Cl.
*G01S 7/35* (2006.01)
*G01S 13/931* (2020.01)
*G06F 3/06* (2006.01)

(52) U.S. Cl.
CPC ............ *G01S 7/352* (2013.01); *G06F 3/0625* (2013.01); *G06F 3/0634* (2013.01); *G06F 3/0673* (2013.01); *G01S 13/931* (2013.01)

(58) Field of Classification Search
CPC ...... G01S 7/352; G01S 13/931; G01S 5/0258; G01S 5/0263; G01S 7/295; G01S 5/02; G01S 7/4004; G06F 3/0625; G06F 3/0634; G06F 3/0673
USPC .......................................................... 342/175
See application file for complete search history.

(56) References Cited

U.S. PATENT DOCUMENTS 8,819,335 B1 * 8/2014 Salessi ................ G06F 12/0246 711/147
9,541,637 B2 * 1/2017 Searcy .................... H03M 7/30
9,898,341 B2 * 2/2018 Chang ................... G06F 9/5038
10,338,118 B1 * 7/2019 Kempke ........... G01R 29/0878
(Continued)

FOREIGN PATENT DOCUMENTS

EP 2997459 B1 * 3/2018 ......... G06F 12/0246
EP 3143426 B1 * 11/2020 ............. G01S 7/354
(Continued)

OTHER PUBLICATIONS

Gentile et al., "Building and Processing a Radar Data Cube—MATLAB & Simulink," MathWorks, 2016, 7 pages.

*Primary Examiner* — Nuzhat Pervin
(74) *Attorney, Agent, or Firm* — Michael T. Gabrik; Charles F. Koch

(57) ABSTRACT

An example device includes a memory that includes a first portion and a second portion, memory control circuitry structured to receive a first set of data associated with a first radar chirp, receive a second set of data associated with a second radar chirp, store a first subset of the first set of data in the first portion of the memory, store a first subset of the second set of data in the first portion of the memory adjacent to the first subset of the first set of data, and store a second subset of the first set of data and a second subset of the second set of data in the second portion of the memory.

22 Claims, 9 Drawing Sheets

(56) References Cited

U.S. PATENT DOCUMENTS

| | | | | |
|---|---|---|---|---|
| 10,445,896 | B1 * | 10/2019 | Bills | G01B 11/24 |
| 10,627,480 | B2 * | 4/2020 | Nayyar | G01S 13/42 |
| 10,725,169 | B2 * | 7/2020 | Goossen | G01S 13/66 |
| 11,047,950 | B2 * | 6/2021 | Nayyar | G01S 13/343 |
| 11,150,983 | B2 * | 10/2021 | Thompson | G06F 11/1044 |
| 11,327,555 | B2 * | 5/2022 | Yoon | G06F 1/329 |
| 11,536,831 | B2 * | 12/2022 | Lau | G01S 13/867 |
| 11,668,790 | B2 * | 6/2023 | Wu | G01S 7/2883 342/132 |
| 11,796,628 | B2 * | 10/2023 | Nayyar | G01S 13/42 |
| 11,874,395 | B2 * | 1/2024 | Roh | G01S 13/536 |
| 11,899,094 | B2 * | 2/2024 | Jeannin | G01S 13/42 |
| 12,032,088 | B2 * | 7/2024 | Brett | G01S 13/343 |
| 12,066,566 | B2 * | 8/2024 | Ginsburg | G01S 7/023 |
| 12,105,955 | B2 * | 10/2024 | Ayyapureddi | G06F 3/0673 |
| 12,123,946 | B2 * | 10/2024 | Lau | G01S 13/347 |
| 2006/0069896 | A1 * | 3/2006 | Sanders | G11C 5/04 711/168 |
| 2016/0018511 | A1 * | 1/2016 | Nayyar | G01S 7/03 342/27 |
| 2017/0297737 | A1 * | 10/2017 | Arnold | B64D 45/04 |
| 2018/0095162 | A1 * | 4/2018 | Fetterman | G01S 7/023 |
| 2019/0285725 | A1 * | 9/2019 | Roger | G01S 7/023 |
| 2019/0346535 | A1 * | 11/2019 | Thompson | G01S 13/583 |
| 2020/0072941 | A1 * | 3/2020 | Jansen | G01S 13/345 |
| 2020/0225315 | A1 * | 7/2020 | Nayyar | G01S 13/87 |
| 2021/0041555 | A1 * | 2/2021 | Zhong | B60R 11/04 |
| 2021/0042331 | A1 * | 2/2021 | Horton | G06F 16/287 |
| 2021/0278498 | A1 * | 9/2021 | Nayyar | G01S 13/87 |
| 2021/0333386 | A1 * | 10/2021 | Park | G01S 7/356 |
| 2021/0396840 | A1 * | 12/2021 | Bekooij | G01S 13/723 |
| 2022/0276338 | A1 * | 9/2022 | Wu | G01S 13/583 |
| 2022/0317285 | A1 * | 10/2022 | Wang | G01S 13/343 |
| 2022/0334948 | A1 * | 10/2022 | Ozog | G06F 11/3041 |
| 2023/0213639 | A1 * | 7/2023 | McDanell | G01S 13/532 342/70 |
| 2023/0243951 | A1 * | 8/2023 | Jeannin | G01S 13/58 342/22 |
| 2023/0333741 | A1 * | 10/2023 | Ayyapureddi | G06F 3/0659 |
| 2023/0418871 | A1 * | 12/2023 | Horton | G06F 16/287 |
| 2024/0302494 | A1 * | 9/2024 | Pedley | G01S 13/584 |
| 2024/0302519 | A1 * | 9/2024 | Govinda Kammath | G01S 13/343 |
| 2025/0231283 | A1 * | 7/2025 | Kozdon | G01S 13/345 |
| 2025/0341634 | A1 * | 11/2025 | Achatz | G01S 7/417 |

FOREIGN PATENT DOCUMENTS

| | | | | | |
|---|---|---|---|---|---|
| EP | 3805782 | A1 * | 4/2021 | | G01S 7/356 |
| EP | 4310543 | A2 * | 1/2024 | | G01S 7/023 |
| EP | 3935406 | B1 * | 8/2025 | | G01S 7/0235 |
| WO | WO-2006036413 | A2 * | 4/2006 | | G11C 16/06 |

* cited by examiner

METHODS AND APPARATUS TO REDUCE POWER CONSUMPTION OF RADAR MEMORY OPERATIONS

CROSS-REFERENCE TO RELATED APPLICATION

This patent application claims the benefit of and priority to Indian Provisional Patent Application No. 202341042929 filed Jun. 27, 2023, which Application is hereby incorporated herein by reference in its entirety.

TECHNICAL FIELD

This disclosure relates generally to memory access, and, more particularly, to methods and apparatus to reduce power consumption of radar memory operations.

BACKGROUND

Radar systems enable object detection in any number of environments. The automobile industry includes radar systems in some vehicles to enable improved safety features, such as object avoidance and emergency braking.

SUMMARY

For methods and apparatus to reduce power consumption of radar memory operations, an example device includes memory including a first portion and a second portion, and memory control circuitry structured to: receive a first set of data associated with a first radar chirp; receive a second set of data associated with a second radar chirp; store a first subset of the first set of data in the first portion of the memory; store a first subset of the second set of data in the first portion of the memory adjacent to the first subset of the first set of data; and store a second subset of the first set of data and a second subset of the second set of data in the second portion of the memory.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
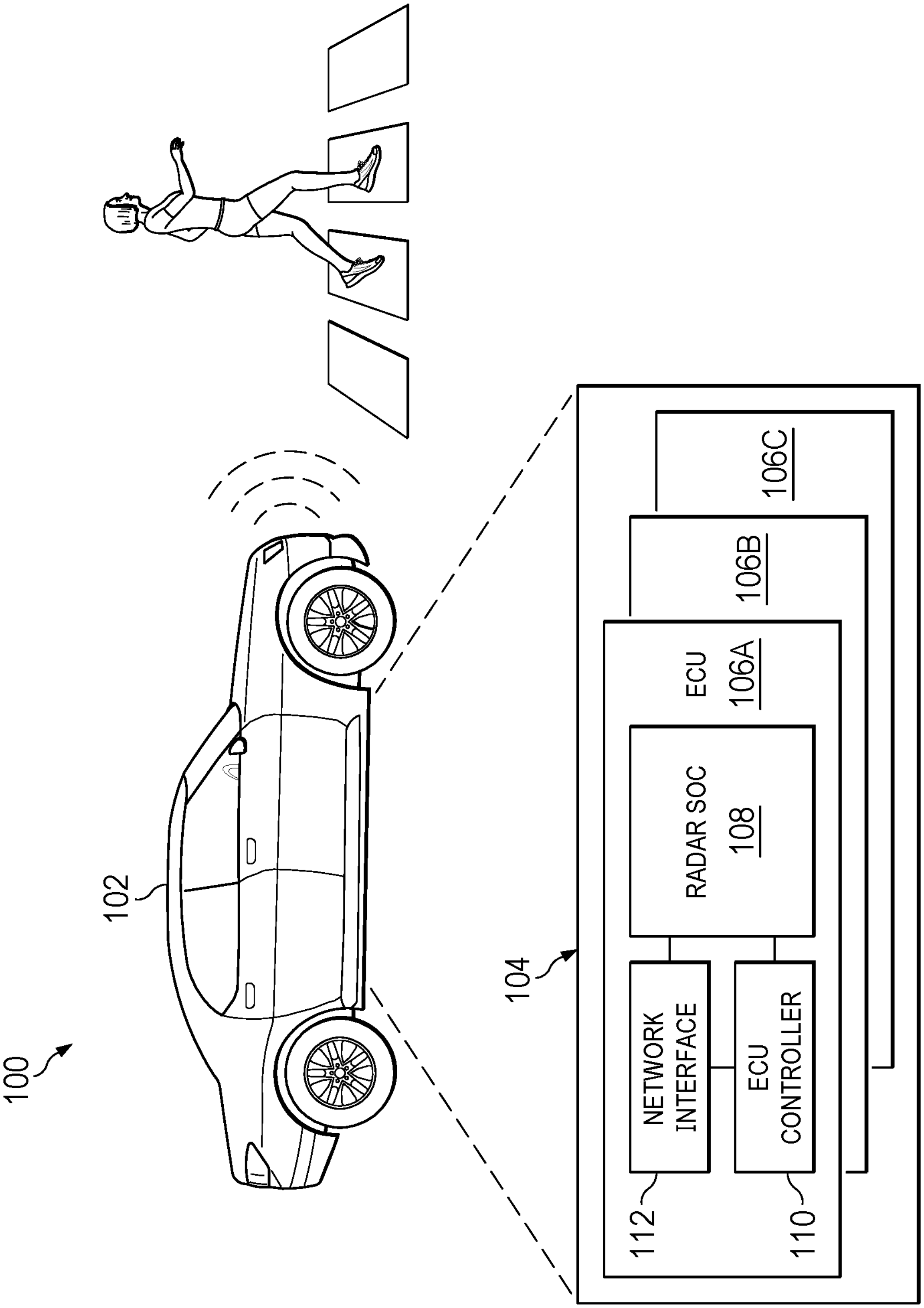
FIG. 1 is a block diagram of an example environment including a Radar System on a Chip (SoC).

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Radar systems typically utilize radar sensors to produce data used to detect obstacles, speed corresponding to the obstacles, and/or direction corresponding to the obstacles. Radar systems may be utilized by any industry, including the automobile industry that enables improved safety features (e.g., object avoidance, emergency braking, etc.) and new autonomous driving features (e.g., navigation). Example radar systems may include, but are not limited to, system-on-a-chip (SoC) devices that communicate and/or otherwise interact with other processing devices to interpret radar data. In some examples, the SoC is in-circuit with and/or otherwise in communication with processing devices to instantiate warning and/or informational prompts regarding obstacle parameters in view of proximity limits, processing devices to facilitate user interaction/interface, etc. In some examples, radar systems are expected to operate in environments having high ambient temperatures. As such, semiconductor-based radar systems may exhibit increased static leakage currents and/or increased power consumption as operating temperatures increase. Additionally, relatively higher power consumption is associated with correspondingly relatively higher heat generation, which may increase a cost of the radar systems in the event expensive heatsink materials are used.

Radar systems include memory devices to store information corresponding to reflected radar chirps. Such memory devices contribute to the overall power consumption of the radar system(s). As used herein, a "chirp," a "radar chirp," or a "radar signal" represents radar information/data (analog) in which a frequency either increases (e.g., up-chirp) or decreases (e.g., down-chirp) with time. Stated differently, a chirp is a transmitted analog radar signal that is reflected and includes an example modulation frequency format used in some radar systems that permit fast collection of spatial data corresponding to objects.

Generally speaking, a reflected radar chirp is received and/or otherwise detected by the radar system and digitized to generate sample data. As used herein, "sample data" or a "sample" is digitized output from one or more analog-to-digital converters (ADCs), and such sample data may be stored in memory. Additionally, the sample data may be processed in connection with one or more signal processing techniques, such as a Fast Fourier Transform (FFT) to generate processed radar data. As used herein, "processed radar data" or "processed data" results from sample data that has been modified in connection with one or more digital signal processing (DSP) techniques and/or algorithms.

In some examples, and as described in further detail below, a range FFT is performed on sample data corresponding to reflected chirps to convert the sample data to a frequency domain. Peak values correspond to ranges (distances) of objects, and such range FFT processing may be performed on sample data corresponding to a previous chirp while other sample data are being collected corresponding to a current chirp (e.g., sometimes referred to as in-line processing). Results of a range FFT may be stored in memory for further processing (e.g., processing to generate Doppler FFT and/or Angle FFT data).

In some examples, radar systems employ frequency modulated continuous wave (FMCW) techniques that transmit chirp signals having frequencies that vary linearly over time. The transmitted chirp signals are reflected off objects and received, and beat frequencies are typically mixed with the reflections of the transmitted radar chirp signal to derive range, Doppler and/or Angle information corresponding to objects. Generally speaking, the radar systems generate one or more radar chirps that are reflected off of objects and fed to and/or otherwise processed by ADCs to generate sample data and/or processed by signal processing systems (e.g., circuitry and/or algorithms corresponding to fast Fourier transform (FFT) techniques) to derive processed radar data indicative of range information, velocity information, and/or angle information. In some examples, prior to using such signal processing systems, large quantities of sample data (e.g., radar data processed by one or more ADCs) are stored to memory in a temporal arrangement, which is sometimes referred to herein as a linear arrangement. In some examples, in-line processing of one or more chirps are performed to generate range FFT data (e.g., a type of processed radar data) that is stored in memory, and subsequent processing of the range FFT data facilitates Doppler FFT and/or Angle FFT data.

For example, and as described in further detail below, any number of sample data corresponding to a first chirp are received and stored in a scratchpad memory in a temporal manner as part of a radar data cube (e.g., a multi-dimensional data array). Stated differently, reflected signals from a first transmitted chirp are received by the radar system, are sampled and the sampled data are stored in memory, followed by reflected signals from a second transmitted chirp, and so on. However, in some examples there is some mixing and/or other processing of the reflected signals after the reflected signals are converted to sample data, but prior to storage in memory. For example, reflected chirps may be received and an ADC conversion and first dimension FFT are performed (e.g., in-line processing) after mixing with the transmitted radar signals to generate intermediate frequency (IF) signals. The example first dimension FFT facilitates range/distance information, which may be stored in memory thereafter. In some examples the first dimension FFT is referred to as including row-wise samples. Further, in some examples a second dimension FFT is performed based on results from the first dimension FFT. In some examples, the second dimension FFT is referred to as including column-wise samples, which contains information corresponding to Doppler aspects (e.g., velocity/speed). Still further, in some examples a third dimension FFT is performed to obtain angular information (e.g., from any number of other receiving devices).

Regardless of the manner in which reflected radar signals are subsequently processed, the sample data resides in the memory (e.g., scratchpad memory) in this temporal arrangement, but subsequent real-time processing of this data with signal processing systems may expect a transposed manner of sample data retrieval, with sample data read operations that do not necessarily translate to sequential address memory operations. Stated differently, read operations may obtain sample data in a manner in which memory addresses are not accessed in a sequentially adjacent manner. For instance, and depending on a type of signal processing system, a first memory read operation occurs with a first memory address. However, a second memory read operation occurs with a second memory address that is not adjacent to the first memory address, such that the second memory address may be located in a different memory location/bank of a memory device. In some instances, this non-adjacent memory access operation is referred to herein as a memory jump or a non-sequentially adjacent memory jump.

Memory devices include any number of memory banks, which are groupings of memory addresses. Additionally, memory devices and/or memory banks include any number of sub-banks (SBs) in which each memory SB includes a common power supply for memory addresses located therein. In some examples, each memory SB (sometimes just referred to as “a SB”) includes its own power supply and power supply controller to allow individual SBs within a memory device to be powered-on and powered-off via control signals in an effort to conserve energy consumption. When a data read operation at a first SB occurs, that SB must first be in a powered-up state. Powering-up a SB results in an inrush current to the memory device in which the first SB resides and a particular time delay (a delay period) to get the first SB ready for read/write operations. However, in some examples the inrush current may be mitigated by causing a relatively slower power-up sequence of the SB (e.g., two or more clock cycles). Stated differently, examples disclosed herein permit memory power-up tasks to occur over a longer period of time so that inrush current values are relatively lower per unit of time. In some examples disclosed herein, alternate resistance paths (e.g., control of high-resistance paths or low-resistance paths) of memory may be utilized to control a rate of current inrush. For instance, in response to a memory power up request the high resistance path is activated and/or otherwise utilized to dampen current inrush effects before activating and/or otherwise utilizing the low resistance path during steady-state runtime after the power-up process has completed. In the event another data read operation is to occur at a memory address located in a second SB of the memory device that is different from the first SB, that second SB must be powered-up, which results in yet another time delay, and in some cases results in an inrush current if there are no mechanisms to control particular memory resistance paths.

Examples disclosed herein reduce occurrences of inrush current during read operations associated with the processing of radar information (e.g., chirps, sample data, etc.). Additionally, because examples disclosed herein reduce inrush current occurrences, corresponding instances of time-delay waiting for inrush current transient settling are reduced. Accordingly, the disclosed examples may have beneficial impacts on power consumption and time-delay.

FIG. 1 is a block diagram of an example environment 100 in which an example radar system may be implemented. In the illustrated example of FIG. 1, the environment 100 includes an example vehicle 102 that includes an example electronic control unit (ECU) cluster 104 having any number of electronic control units (ECUs) **106*a*, 106*b*, 106*c* structured to provide services for the vehicle 102. Services may include, but are not limited to, an engine control module (ECM), a powertrain control module (PCM), a transmission control module (TCM), a brake control module (BCM), and a radar control system (RCS). In the illustrated example of FIG. 1, a first ECU 106*a* includes example radar circuitry, such as an example radar system-on-a-chip (SoC) 108 that is communicatively connected to an example ECU controller 110 and an example network interface 112. Of course, the first ECU 106*a* may include any other suitable functionality. The example first ECU 106*a* is communicatively connected to any number of additional ECUs within the ECU cluster 104** via, for example, one or more busses.

Figure 2:
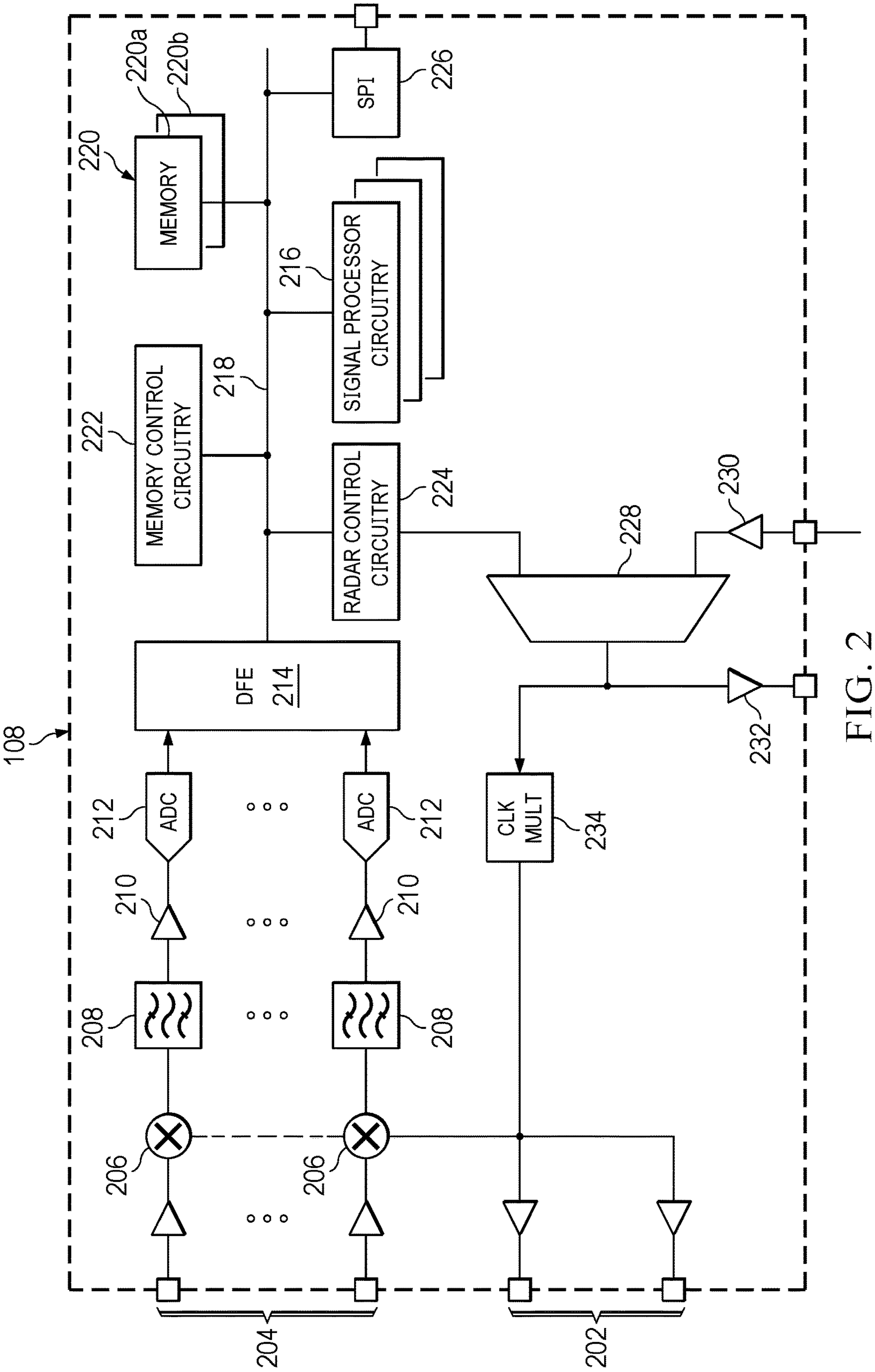
FIG. 2 is a block diagram of an example implementation of the Radar SoC of FIG. 1.

FIG. 2 is a block diagram showing further detail of the example radar SoC 108 (sometimes referred to herein as "radar SoC circuitry" or "radar circuitry") of FIG. 1, which may be structured as an example frequency modulated continuous wave (FMCW) radar system to perform radar tasks. The radar SoC 108 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the radar SoC 108 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry (e.g., digital signal processing (DSP) circuitry) executing instructions and/or FPGA circuitry performing operations to implement one or more virtual machines and/or containers.

In the illustrated example of FIG. 2, the radar system 108 includes one or more transmit channels 202 (sometimes referred to herein as "transmit circuitry") to transmit FMCW signals (sometimes referred to herein as "radar chirps" or "chirps"), and one or more receive channels 204 (sometimes referred to herein as "receive circuitry") to receive the reflected transmitted FMCW signals. While the illustrated example of FIG. 2 includes two transmit channels 202 and two receive channels 204, examples disclosed herein are not limited thereto. For instance, in some examples alternate quantities of transmit and receive channels may be included in which a greater quantity of receive channels than transmit channels are implemented (e.g., two transmit channels and four receive channels).

The illustrated example of FIG. 2 includes mixers 206 to mix transmitted signal frequencies with received signals to generate beat signals (sometimes referred to as de-chirped signals, intermediate frequency (IF) signals, or raw radar signals) of the receive signals. Respective mixers 206 are communicatively connected to respective baseband bandpass filters 208 to filter the beat signals, respective variable gain amplifiers (VGAs) 210 to amplify the filtered beat signals, and respective analog-to-digital converters (ADCs) 212 to convert the analog beat signals to a digital arrangement (e.g., sample data).

The illustrated example of FIG. 2 also includes a digital front end (DFE) 214 to, in part, perform decimation filtering on the digital beat signals to reduce the sampling rate and bring the signals back to a baseband frequency range. In some examples, the DFE 214 performs any number of additional tasks such as, but not limited to, DC offset removal. The example DFE 214 is communicatively connected to memory 220 to facilitate storage of radar information (e.g., sample data). The example DFE 214 is also communicatively connected to signal processor circuitry 216 (e.g., via a bus 218) to perform signal processing on the beat signals of one or more radar frames and provide results to the example ECU 106*a* of FIG. 1. However, in some examples the signal processor circuitry 216 performs such signal processing on the sample data that have been stored in their temporal arrangement in the memory 220. Stated differently, a first quantity of sample data is acquired at a first time after a particular quantity of transmitted radar chirps and corresponding received reflections and stored in the memory 220, and analysis and/or processing of such reflections (sample data) occur at a second time after the first time. In some examples, the signal processor circuitry 216 performs range fast-Fourier-transform (FFT), Doppler FFT and/or object detection based on respective sequences of sample data (e.g., chirps from radar frames that have been digitized). The example signal processor circuitry 216 may be implemented as any type of FFT circuitry, a digital signal processor (DSP), a field programmable gate array (FPGA), an application specific integrated circuit (ASIC), etc.

The illustrated example radar system 108 of FIG. 2 includes memory 220, such as a computer readable medium, storage device or storage disk to communicate data between different structures of the example radar system 108. In some examples, the memory 220 is static random access memory (SRAM), but other types of memory may be used. Other types of memory include dynamic RAM (DRAM), but SRAM exhibits relatively faster access times and consumes less power than DRAM. In some examples, the memory 220 includes memory banks (sometimes referred to as "sub-banks") that can be individually powered-on and powered-off (e.g., one or more relatively lower-power modes, such as standby mode or low-power mode), depending on demand. Generally speaking, power consumption may be a significant concern for high performance radar devices, particularly when operating in relatively high temperature environments (e.g., greater than 105 degrees C.). The example radar system 108 of FIG. 2 also includes memory control circuitry 222 to, in part, control read requests, write requests and/or gate power to different memory sub-banks during operation, as described in further detail below. The example memory 220 may exhibit leakage power in a standby mode, but less leakage power is lost in the event one or more sub-banks are placed in a low-power mode (e.g., sometimes referred to herein as a "retention mode," which is a mode that consumes less power than the standby mode), as described in further detail below.

The illustrated example radar system 108 of FIG. 2 includes radar control circuitry 224 to control the operation and/or otherwise coordinate radar activity of the example radar system 108. In some examples, the radar control circuitry 224 is a processor, a DSP, an FPGA, an ASIC, or combinations thereof. In some examples, the radar control circuitry 224 includes timing circuitry to receive chirp parameter values for one or more sequences of chirps in a radar frame to facilitate chirp control generation signals to control the transmission and reception of chirps. Chirp parameters include transmitter enable parameters to identify particular transmitters to enable, chirp frequency start value parameters, chirp frequency slope parameters, ADC sampling time parameters, ramp end time parameters, and transmitter start time parameters. In some examples, the radar control circuitry 224 includes radio frequency synthesizer (RFSYNTH) circuitry to generate FMCW signals for transmission based on chirp control signals. In some examples, RFSYNTH circuitry includes phase locked loop (PLL) capabilities with voltage controlled oscillators.

In some examples the radar control circuitry 224 is connected to a multiplexer 228 structured to select between signals received from an input buffer 230 and FMCW signals from the radar control circuitry 224. Output from the example multiplexer 228 can be combined with an example output buffer 232 in the event of chained radar SOC configurations and an example clock multiplier 234 to increase the frequency when application to the example transmit channels 202. In some examples, a serial peripheral interface (SPI) 226 and/or other network interface facilitates communication with the example network interface 112 and/or the example ECU controller 110 of FIG. 1 to send and/or receive control information (e.g., timing and frequencies of chirps, output power levels, triggering control, phase noise monitoring, etc.).

Figure 6:
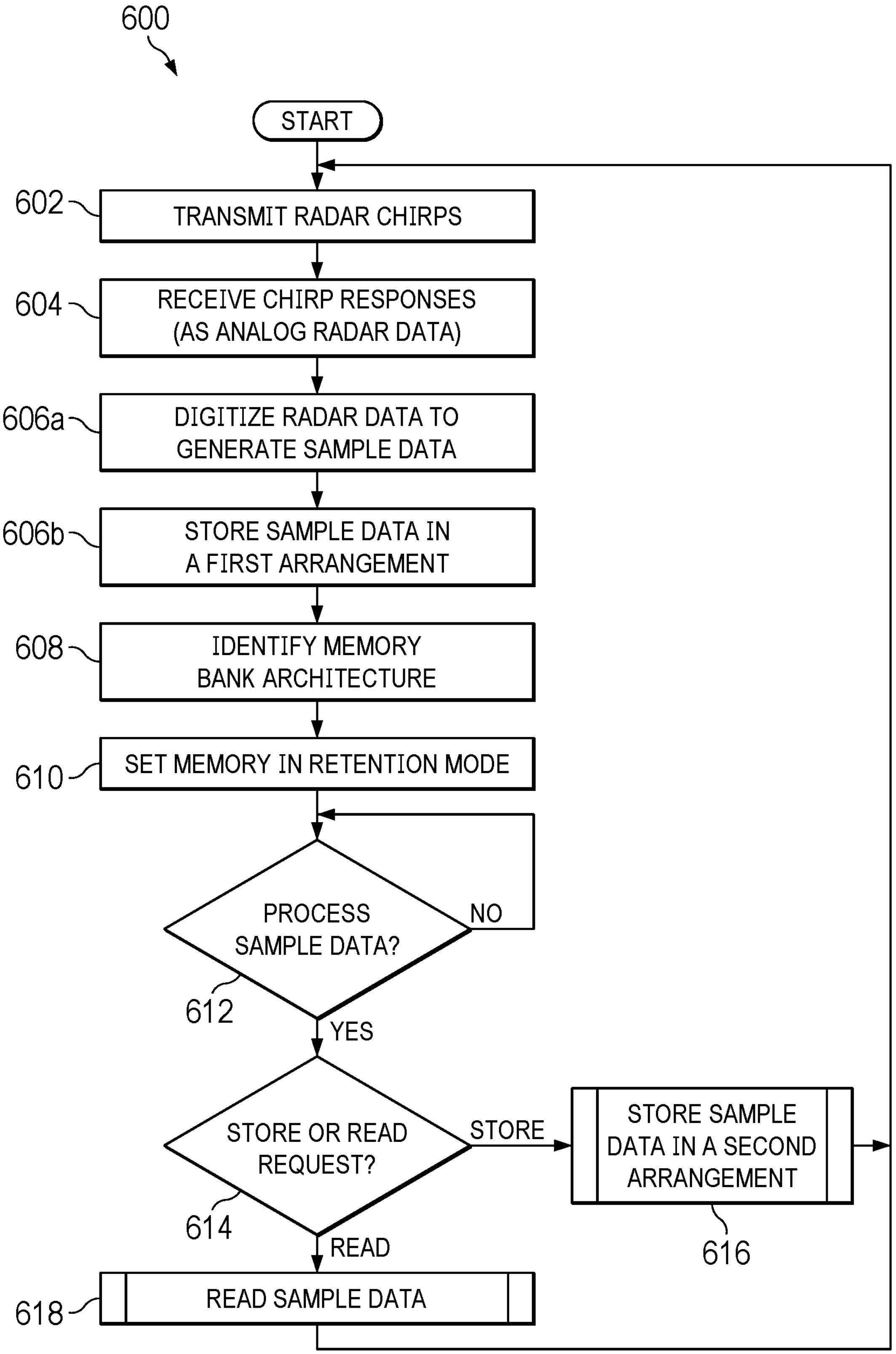
FIGS. 6-8 are flowcharts representative of example machine-readable instructions and/or example operations that may be executed, instantiated, and/or performed using an example programmable circuitry implementation of the Radar SoC of FIGS. 1-3.
Figure 7:
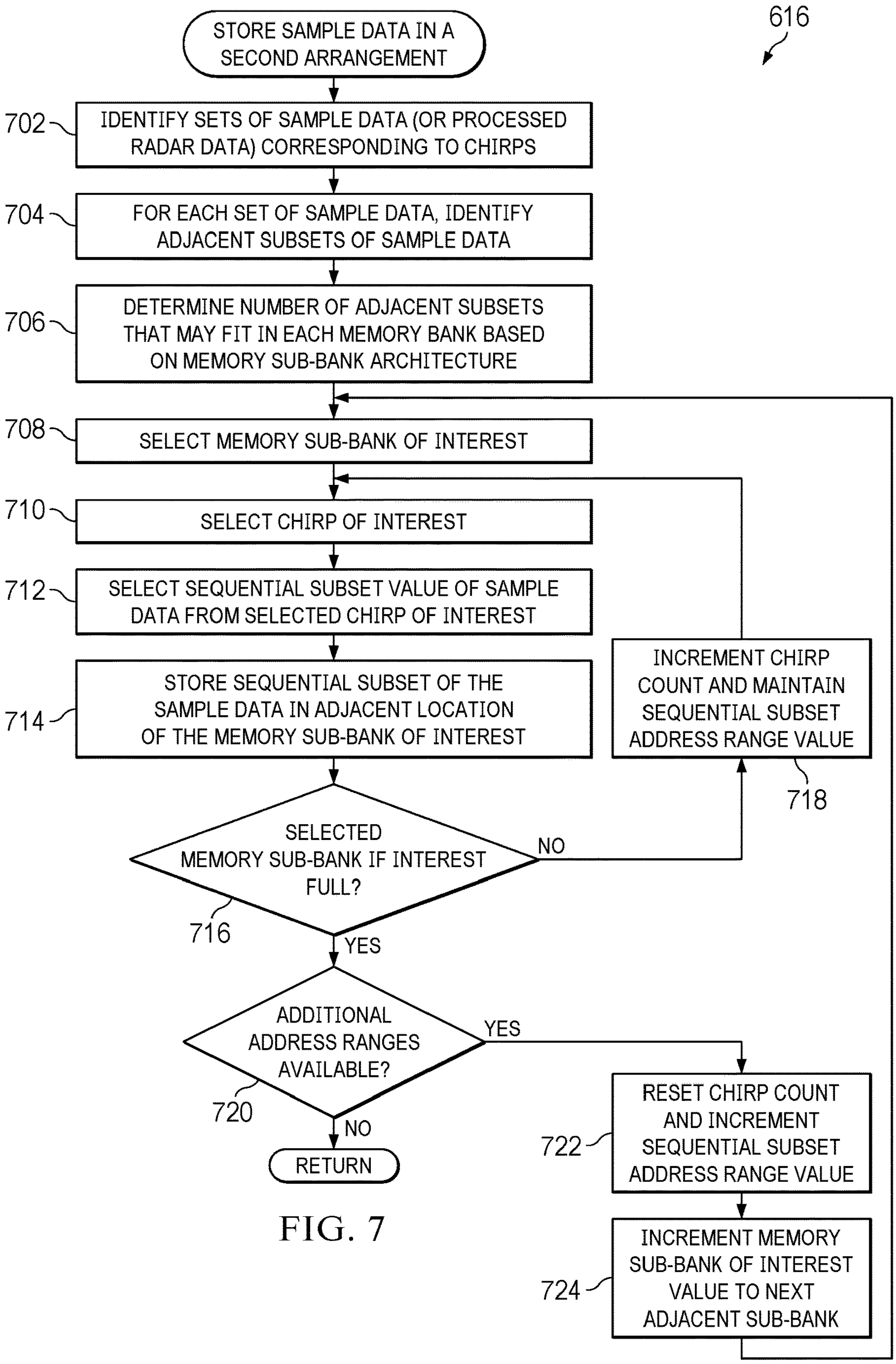
Figure 8:
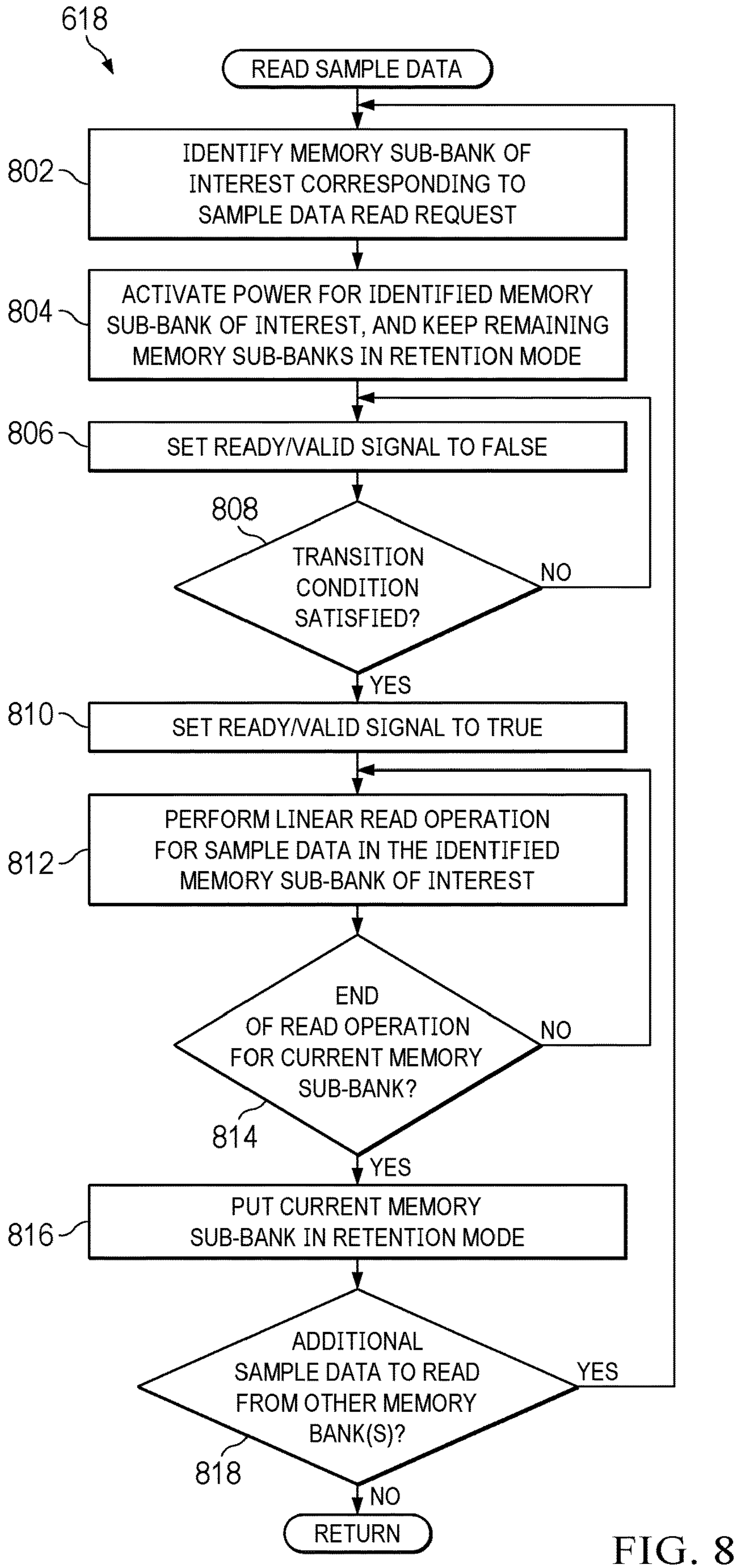

In some examples, the radar SoC circuitry 108, the memory control circuitry 222, the radar control circuitry 224, and/or the signal processor circuitry 216 is/are instantiated by programmable circuitry executing respective radar, memory control, radar control and signal processing instructions and/or configured to perform operations such as those represented by the flowchart(s) of FIGS. 6-8.

In some examples, the radar SoC 108 includes means for controlling memory, means for controlling radar and means for processing signals. For example, the means for controlling memory, the means for controlling radar, and the means for processing signals may be implemented by, respectively, the example memory control circuitry 222, the example radar control circuitry 224, and the signal processor circuitry 216. In some examples, the aforementioned circuitry may be instantiated by programmable circuitry such as the example programmable circuitry 912 of FIG. 9. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 3:
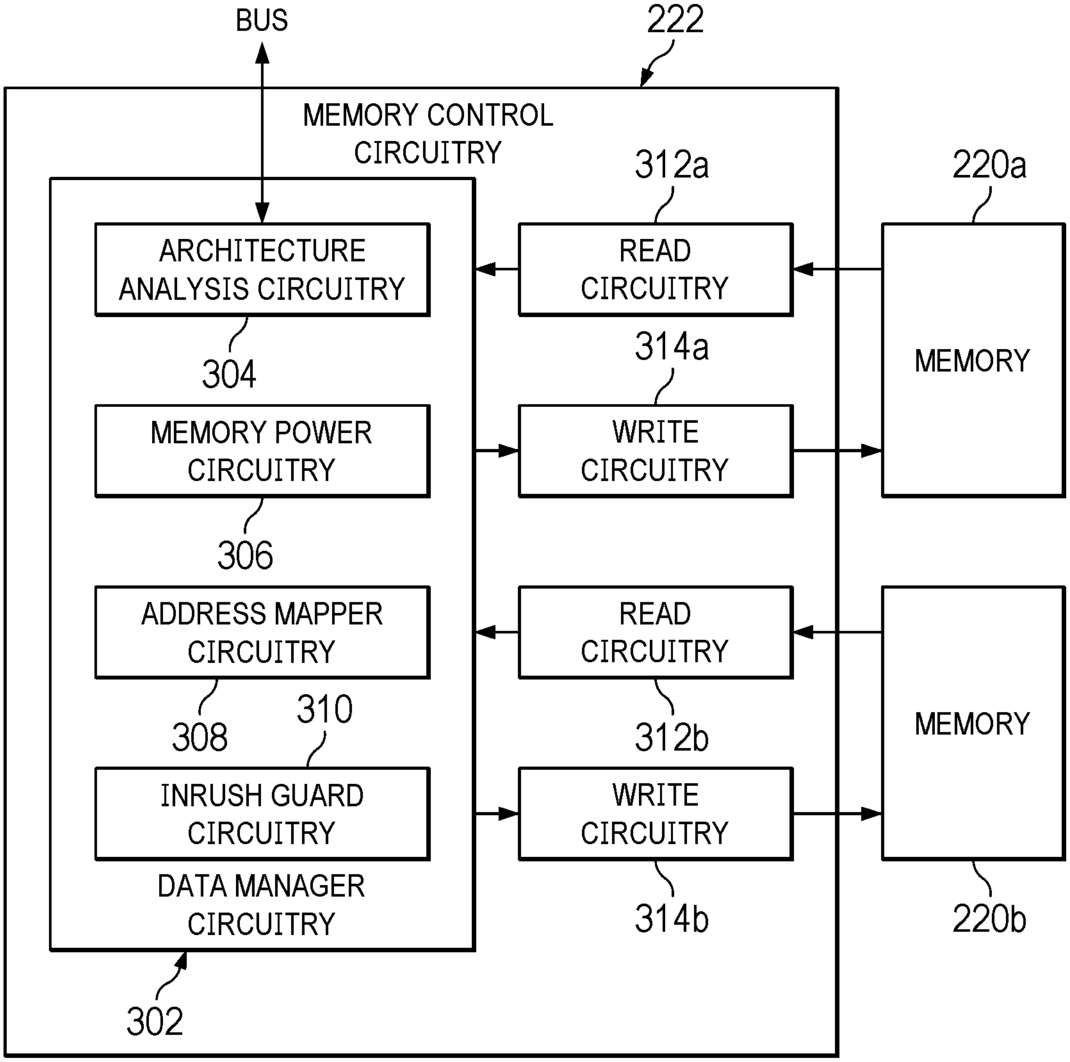
FIG. 3 is a block diagram of an example implementation of the memory control circuitry of FIG. 2.

FIG. 3 includes additional detail corresponding to the example memory control circuitry 222 of FIG. 2. In the illustrated example of FIG. 3, the memory control circuitry 222 includes example data manager circuitry 302, which includes example architecture analysis circuitry 304, example memory power circuitry 306, example address mapper circuitry 308, and example inrush guard circuitry 310. The example memory control circuitry 222 also includes example read circuitry 312*a* and example write circuitry 314*a* to control read and write tasks, respectively, for a first sub-bank of the example memory 220, which is shown in the illustrated example of FIG. 3 as a first memory bank 220*a* (sometimes referred to herein as a "first bank"). Similarly, the example memory control circuitry 222 includes example read circuitry 312*b* and example write circuitry 314*b* to control read and write tasks, respectively, for a second sub-bank of the example memory 220, which is shown in the illustrated example of FIG. 3 as a second memory bank 220*b* (sometimes referred to herein as a "second bank"). While the illustrated example of FIG. 3 only includes a first bank 220*a* and a second bank 220*b*, examples disclosed herein are not limited thereto and any number of banks (e.g., and sub-banks as described in further detail below) may be considered. In still other examples, memory 220*a* may be a first memory device having any number of banks and/or sub-banks, and memory 220*b* may be a second memory device handing any number of banks and/or sub-banks.

In some examples, the memory control circuitry 222 is instantiated by programmable circuitry executing memory control instructions and/or configured to perform operations such as those represented by the flowchart(s) of FIGS. 6-8.

In some examples, the memory control circuitry 222 includes means for data managing, means for architecture analysis, means for memory power managing, means for address mapping, and means for inrush guard controlling. For example, the means for data managing, the means for architecture analysis, the means for memory power managing, the means for addressing mapping, and the means for inrush guard controlling may be implemented by respective ones of the example data manager circuitry 302, the example architecture analysis circuitry 304, the example memory power circuitry 306, the example address mapper circuitry 308, and the example inrush guard circuitry 310. In some examples, the aforementioned circuitry may be instantiated by programmable circuitry such as the example programmable circuitry 912 of FIG. 9 executing machine executable instructions such as those implemented by example blocks of FIGS. 6-8. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In operation, the example transmit circuitry 202 transmits radar chirps that are received by the example receive circuitry 204, which is still radar data in an analog format. The example radar control circuitry 224 causes generation of sample data based on the analog signals received by the receive circuitry 204. In some examples, the radar control circuitry 224 invokes the memory control circuitry 222 to store data corresponding to the received radar information (e.g., radar chirps that have been digitized) in a default arrangement that stores as fast as possible. In other words, some example implementations store data corresponding to the received radar reflections in a manner that is independent of a data structure and/or arrangement that is used for subsequent signal processing tasks, such as FFT tasks. In other examples, and as described above, the radar control circuitry 224 invokes the memory control circuitry 222 to store data corresponding to the received radar signals after they have been processed in a manner corresponding to a range FFT.

As described above, while some memory storage operations cause data to be stored in a linear manner based on a time of receiving a reflected radar signal, subsequent signal processing of a set of radar signals (e.g., in an effort to determine an object speed, an object trajectory, etc.) will read that data in a different non-linear and/or otherwise transposed arrangement. However, when such non-linear and/or otherwise transposed memory operations occur on sample data corresponding to radar signals, a sub-bank corresponding to the accessed memory address must be powered on before the memory operation will be successful and/or otherwise operate in an error free manner. Such power-on occurrences also consume a finite amount of time to settle to a non-transient state. As such, in the event a subsequent memory read is not a memory address within the same powered on sub-bank, the power on sequence must repeat itself, thereby consuming additional energy and time. As such, examples disclosed herein rearrange sample data in a manner that permits multiple memory read operations within a same sub-bank, thereby reducing a number of occurrences where memory access attempts span different sub-banks.

Figure 4:
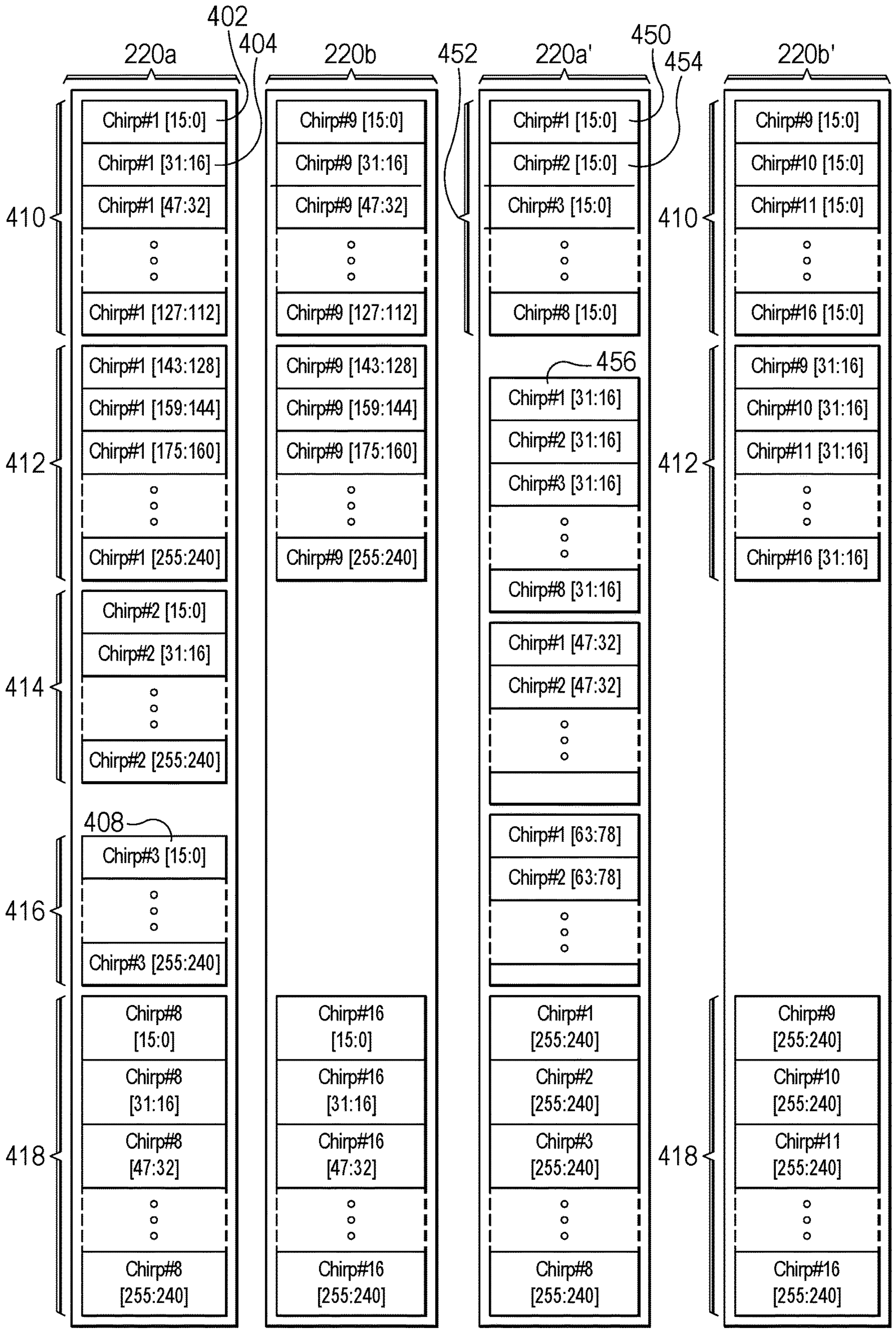
FIG. 4 is a memory map of a first and second memory bank prior to sample data reorganization, and the first and the second memory bank after the sample data reorganization caused by examples disclosed herein to reduce memory consumption of radar memory operations facilitated by the Radar SoC of FIGS. 1, 2 and 3.

FIG. 4 is a memory map 400 that includes the first (memory) bank 220*a* and the second bank 220*b*. As described in further detail below, the first bank 220*a* and the second bank 220*b*, both of which are shown on the left-hand side of FIG. 4, illustrate an arrangement of data storage (digitized sample data) that initially results after a quantity of reflected radar chirps (analog radar data) is received. Additionally, and as described in further detail below, a rearranged and/or otherwise adjusted first bank 220*a*' ("a prime") and a rearranged and/or otherwise adjusted second bank 220*b*' ("b prime"), both of which are shown on the right-hand side of FIG. 4, illustrate a rearranged configuration of data storage of the previously received sample data. In some examples, an initial storage of sample data to memory occurs in a default manner, which may reflect a temporal arrangement of sample data as shown in first bank 220*a* and second bank 220*b*. The sample data may be processed (e.g., including one or more FFT operations) and the resulting processed radar data may be stored in a second arrangement, which may be based on subsequent processes to be performed on the processed radar data, as shown in first bank 220*a*' and 220*b*'. In the illustrated example of FIG. 4, the first bank 220*a* includes sample data corresponding to a first radar chirp (Chirp #1), in which the first radar chirp data is stored in sixteen (16) separate memory locations that are sixteen (16) bits wide. The example first bank 220*a* also includes sample data corresponding to additional radar chirps (e.g., Chirps #2 through #8) in a similar manner. Furthermore, the example second bank 220*b* includes sample data corresponding to still further radar chirps (e.g., Chirps #9 through #16). In total, the illustrated example of FIG. 4 includes 256 samples per chirp with 16 chirps, total. While the illustrated example of FIG. 4 includes memory having 16-bit data, and memory banks capable of storing eight chirps worth of sample data, examples disclosed herein are not limited thereto. Additionally, while the illustrated example of FIG. 4 includes two banks (i.e., the first bank 220*a* and the second bank 220*b*), examples disclosed herein are not limited thereto.

In the illustrated example of FIG. 4, the first bank 220*a* includes a first sample 402 corresponding to the first radar chirp (Chirp #1). The example first sample 402 is 16 bits wide [15:0], which is adjacent to a second sample 404 that is also 16 bits wide [31:16]. In the illustrated example of FIG. 4, the first radar chirp (Chirp #1) includes sixteen (16) similarly structured samples, the last of which consumes bits [255:240]. These sixteen (16) samples are written to the memory in a linear manner or, stated differently, in a temporal manner based on a time of sample receipt. However, when the signal processor circuitry 216 proceeds to determine spatial characteristics of an object (e.g., using a signal processing technique, such as FFT), the sample data are read in a transposed manner.

For example, the signal processor circuitry 216 evaluates a first sample corresponding to a number of successive radar chirps in an effort to determine spatial changes in the object, such as speed and direction (e.g., to determine speed characteristics, direction characteristics, angle characteristics, etc.). To illustrate, transposed sample data is indicative of a first sample corresponding to a first chirp (see the first sample 402 corresponding to the first chirp), a first sample corresponding to a second chirp (e.g., a second chirp that occurred temporally later than the first chirp) (see a first sample corresponding to a second chirp 406), a first sample corresponding to a third chirp (e.g., a third chirp that occurred temporally later than the second chirp) (see a first sample corresponding to a third chirp 408), and so on. Because the signal processing algorithm requires a transposed data input, the memory read operations are not adjacent to each other.

This non-adjacent memory read operation causes at least two problems with traditional radar systems. First, the sub-banks may be in a low power (e.g., retention) mode, and thus, each memory sub-bank may undergo a power activation (e.g., via one or more activation request messages) before it is operational, which causes an inrush current of different magnitudes. As described above, if a power-on transition is forced to occur during a single clock cycle, then a corresponding inrush current magnitude per unit of time will be relatively greater when compared to transition periods of two or more clock cycles. In response to an activation request message for a particular SB, examples disclosed herein restrict read and/or write operations of other SBs and/or portions of memory. Second, because each inrush current is a transient event, a finite amount of time must be allocated and/or otherwise expire to allow the memory bank to become fully operational and capable of the memory (e.g., read) operation. As such, if a first sample (e.g., the first sample 402 corresponding to the first radar chirp) read operation is requested, then a first inrush current occurs that takes a first amount of time. Then if a second radar sample (e.g., the first sample data corresponding to the second radar chirp 406) read operation occurs, then a second inrush current occurs that takes a second amount of time that is added to the first amount of time. With each additional transposed memory read operation, additional inrush current events and corresponding time delays occur.

In the illustrated example of FIG. 4, the first memory bank 220*a* includes a first sub-bank (SB) 410. The first SB 410 includes sixteen address locations that are each 16 bits wide (e.g., address [15:0] through [127:112]). The illustrated example of FIG. 4 includes a second SB 412 that also includes sixteen address locations that are each 16 bits wide (e.g., addresses [143:128] through [255:240]. As such, sample data corresponding to a radar chirp consumes and/or otherwise populates sample data that spans two separate SBs of the first memory bank 220*a*. The illustrated example of FIG. 4 also includes a third SB 414, a fourth SB 416, up to a sixteenth ($16^{th}$) SB 418 for sample data [143:128] through [255:240] of the eighth chirp. Examples disclosed herein adjust the data structure corresponding to memory 220 in a manner that reduces SB transitions during adjacent memory read operations, thereby reducing a power consumption of the radar system and increasing an operational performance metric (e.g., speed) of the radar system.

The example architecture analysis circuitry 304 identifies a memory bank architecture to determine when a particular sample data read operation crosses from one SB to a different SB, thereby causing a new inrush current event and time consumption event in response to an activation request message to that particular SB that is to be powered up. Additionally, the architecture analysis circuitry 304 determines how many data samples will fit within each identified SB of memory. For instance, in the illustrated example of FIG. 4 each SB can include sixteen samples, each sample having a 16-bit width. The example memory power circuitry 306 sets all memory initially in a retention mode, which allows power savings on an idle memory device within the radar system. The example memory control circuitry 222 determines whether one or more sample data is to be processed and, if so, determines whether that request corresponds to a read or a write operation.

For the sake of discussing a temporal operation of examples disclosed herein, write operations for memory sample rearrangement will initially be discussed with the assumption that sample data have been initially ported into the memory 220*a* and 220*b* in the temporal/linear arrangement of FIG. 4. At least one objective of examples disclosed herein is to facilitate a manner of linear data reads that reduces an occurrence of jumping from one SB to another SB. As such, initially stored samples are rearranged and/or otherwise re-stored in a manner that reduces SB transitions. The example address mapper circuitry 308 identifies sets of sample data corresponding to different chirps (e.g., Chirp #1, Chirp #2, etc.). For each set of sample data (which may correspond to two or more chirps), the address mapper circuitry 308 identifies adjacent subsets of the sample data. As described above, adjacent subsets of the data include groups of increasing memory addresses, such as a first sample having a bit range of [15:0], a second sample having a bit range of [31:16], and so on. The architecture analysis circuitry 304 determines a number of adjacent subsets that can fit within a memory sub-bank, and the address mapper circuitry 308 selects a first memory sub-bank to be populated. For instance, if this is the first iteration of operation, then the memory power circuitry 306 causes and/or otherwise transmits an activation request message to the SB to be powered-up, which in this example is the first sub-bank of the first memory bank 220*a* is selected to be populated with a different data structure arrangement that does not cause as many SB jumps. The example memory power circuitry 306 also restricts read/write operations on other SBs in an effort to conserve energy.

The example address mapper circuitry 308 selects sample data corresponding to a chirp of interest, such as Chirp #1 in the event this is the first iteration through the memory re-arrangement process. The address mapper circuitry 308 selects a sequential subset value of sample data from the selected chirp of interest, in which the sequential subset value corresponds to a particular data sample address range (e.g., [15:0]). In this first example iteration, the chirp of interest is Chirp #1 and the sequential subset value (e.g., sample data) is [15:0], which is shown in the illustrated example of FIG. 4 as the first sample 402. This sequential subset value of sample data is stored in the selected sub-bank of interest as a first adjusted data sample 450. As shown in FIG. 4, and as briefly discussed above, the first memory bank 220*a* represents the memory prior to sample data adjustments (but after an ADC digitization), and an adjusted first memory bank 220*a*' (prime) represents the adjusted memory. Alternatively, in some examples the first memory bank 220*a* represents the memory prior to sample data adjustments, but after an in-line range FFT operation. As such, the adjusted first memory bank 220*a*' (prime) represents the adjusted memory in view of those range FFT operation(s) performed in-line. Similarly, the second memory bank 220*b* represents the memory prior to sample data adjustments, and an adjusted second memory bank 220*b*' represents the adjusted memory. For the sake of ease of reference, the sub-banks of memory will retain their previously established reference numbers as described above, such that the adjusted first memory bank 220*a*' includes the first SB 410, the second SB 412, the third SB 414, the fourth SB 416 and the eighth SB 418 in a similar horizontal representation.

After writing the first adjusted sample data 450 to the selected sub-bank of interest (the first SB 410), the architecture analysis circuitry 304 determines if the selected memory SB is full. In this example, the selected sub-bank of interest is not full because there are fifteen remaining address locations to be written (see 452). The example address mapper circuitry 308 increments a chirp of interest value (e.g., a chirp count value). For example, the chirp of interest was previously Chirp #1, but is now incremented to Chirp #2. However, while the chirp count value is incremented, the sequential subset value is maintained at its current setting, which was memory addresses that satisfy the range [15:0]. At this point, the iteration repeats, but now the example first sample data corresponding to the second chirp 406 is selected for writing to the next adjacent and available memory location of the first SB, which in this example is a second adjusted data sample 454. As shown in the illustrated example of FIG. 4, the second adjusted data sample 454 is adjacent to the first adjusted data sample 450, thereby allowing a linear read for any signal processing algorithm when obtaining first data samples corresponding to first, second, third, etc. chirps. Based on the example memory sizes described herein, sixteen memory reads by the signal processing algorithm can occur prior to a different sub-bank boundary being crossed.

When the example architecture analysis circuitry 304 determines that the selected memory sub-bank of interest is full (e.g., the first adjusted data sample 450 and all of the data samples of 452 have been populated), the architecture analysis circuitry 304 determines if there are additional address ranges (e.g., sequential subset values larger and adjacent to the most recently analyzed values) available to be processed from the original sample data. For instance, if the address range of [15:0] was processed corresponding to all available chirps of sample data, then the architecture analysis circuitry 304 determines if the adjacent address range of [31:16] has data samples to be considered. If so, then the chirp count value is reset to 1 while maintaining the adjacent/subsequent address range of [31:16] during another iteration of data rearrangement. Additionally, the next available sub-bank is selected for population. For instance, if the first sub-bank 410 was populated, then the address mapper circuitry 308 selects the second sub-bank 412 to be populated, and so on.

In this way, portions of each chirp data set may be interleaved with corresponding portions of data sets associated with other chirps. For example, bits [15:0] of a set of data associated with a first chirp (e.g., data 450) is separated from bits [31:16] of the set of data associated with the first chirp (e.g., data 456) by bits [15:0] of other sets of data associated with other chirps. In some such examples, bits [15:0] and bits [31:16] of the set of data associated with the first chirp are stored in different sub-banks.

In response to a read request, such as when the example radar SoC 108 instantiates a signal processing algorithm from the example signal processor circuitry 216, the example address mapper circuitry 308 identifies a memory sub-bank of interest corresponding to the adjusted sample data read request. For example, the read request may correspond to the first adjusted sample data corresponding to a first chirp 450, followed by a read request corresponding to a second adjusted data sample corresponding to the second chirp 454 (and temporally subsequent), and so on. Because the first adjusted sample data corresponding to the first chirp 450 is located in the first sub-bank 410, the example memory power circuitry 306 activates that particular memory bank of interest, which was previously in a retention mode or other low-power mode. As described above, the initiation of a sub-bank from a retention, sleep or dormant mode into an active mode causes an inrush current to the sub-bank, which is associated with a period of time that must expire before the sub-bank is ready for read and/or write operations.

Figure 5:
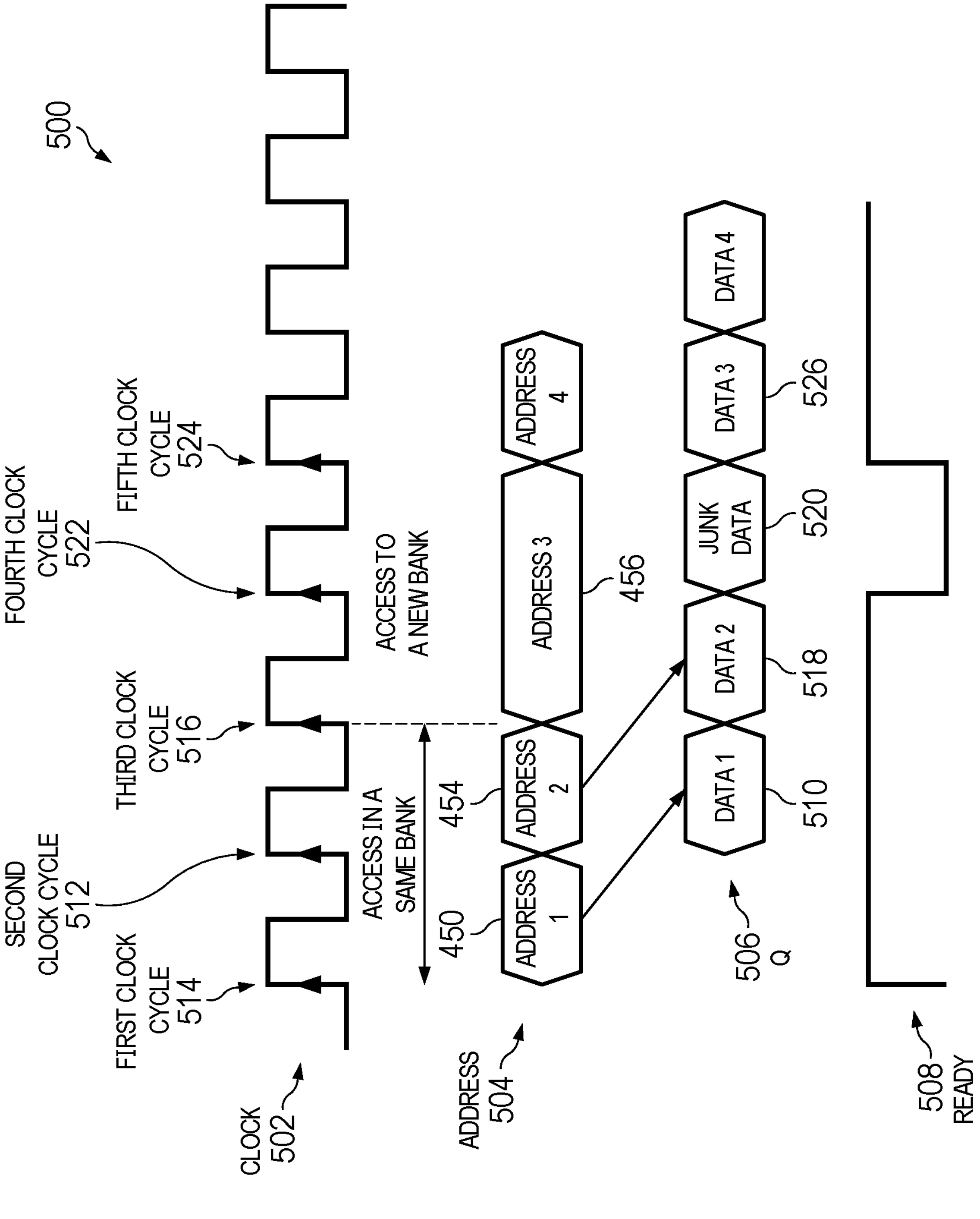
FIG. 5 is a timing diagram of memory gate control facilitated by the Radar SoC of FIGS. 1-3 to reduce memory consumption of radar memory operations.

FIG. 5 is a timing diagram 500 to illustrate example gate control of memory devices. In the illustrated example of FIG. 5, a clock signal 502 corresponds to a system clock that may be shared among the structure of the example radar SoC 108, including the memory 220. The illustrated example of FIG. 5 also includes an address signal 504 that includes a particular memory address corresponding to a memory operation (e.g., read, write). The illustrated example of FIG. 5 also includes a memory output gate (Q) 506 corresponding to output values of the example memory 220 in the event of a read. The illustrated example of FIG. 5 also includes a ready signal 508 controlled by the example memory control circuitry 222 or the memory power circuitry 306 to identify when the memory output gate (Q) 506 information is either valid or invalid (to be ignored). In some examples, when the ready signal 508 is FALSE, read and/or write operations of a particular portion of memory (e.g., a sub-bank) are restricted. In some examples, the memory operation restrictions occur for a predetermined amount of time (e.g., a delay period) or a predetermined number of clock cycles. In some examples, the memory control circuitry 222 permits memory operations (e.g., for read or write) only after a delay period that corresponds to a completion of storage in a prior portion of memory. In some examples, the inrush guard circuitry 310 monitors for an inrush current phase and/or completion thereof before read/write operations are permitted. As described above, the ready signal 508 may be controlled for any number of clock cycles during a transition from one SB to another SB. For instance, when the amount of time that the ready signal 508 is a relatively short period of time (e.g., a single clock cycle), then the amount of current per unit of time to the new SB is relatively large. While the illustrated example of FIG. 5 shows a single clock cycle, this is for example purposes only and not a limitation. In some examples the ready signal may be kept low for two or more clock cycles in an effort to prevent the inrush current low.

To illustrate an example operation of the ready signal 508, consider a first adjusted sample data 450 is identified by the example signal processor circuitry 216 for a read operation in an effort to perform an FFT. Also consider that upon beginning this example operation, a first SB 410 is already in a powered-on state. The example memory control circuitry 222 determines that the first adjusted sample data 450 is in a location (bits [15:0] of Chirp #1) corresponding to the first SB 410 that is in a powered-on state and, as such, the example memory power circuitry 306 is instantiated to activate and/or otherwise toggle a state of the ready signal 508 to TRUE (or "1", or "ON", etc.). When the ready signal 508 is TRUE, the example memory control circuitry 222 designates the memory output gate (Q) 506 to have valid information based on for the clock signal corresponding to (a) the current clock cycle (b) plus one. Stated differently, the first adjusted sample data 450 corresponds to a first value 510 of the memory output gate (Q) 506, the output of which (see DATA 1) is to be trusted and/or otherwise accepted at a second clock cycle 512 (e.g., a current clock cycle, which is a first clock cycle 514 in this example, plus one). At the beginning of the second clock cycle 512, the memory control circuitry 222 determines that the second adjusted sample data 454 is in a location (bits [15:0] of Chirp #2) corresponding to the first SB 410 that is still in the powered-on state. The example memory control circuitry 222 has also determined that this new/subsequent memory address has not crossed over or otherwise jumped to a different SB. The example memory control circuitry 222 maintains the state of the ready signal 508 as TRUE. Because this iteration of the example operation is occurring at the second clock cycle 512, the TRUE value of the ready signal 508 means that second value 518 (see DATA 2) from the memory output gate (Q) 506 during a third clock cycle 516 should be accepted and/or otherwise trusted.

At the beginning of the third clock cycle 516, the memory control circuitry 222 determines that a third adjusted sample data 456 is in a location (bits [31:16] of Chirp #1) corresponding to the second SB 412, that is currently in a retention mode in an effort to save power for the example radar SoC 108. As described above, before any read operations can occur with the second SB 412, it must be provided sufficient power and/or otherwise switched to an active mode, which takes a finite amount of time and causes an inrush current to the second SB 412. During this finite amount of time while the second SB 412 is being powered-on, a third value (junk data) 520 may result because the second SB 412 is going through a finite period of transient power status. In response to the memory control circuitry 222 determining that a sub-bank boundary has been crossed from a current and active sub-bank to a new and unpowered sub-bank, the ready signal 508 is pulled and/or otherwise transitioned from TRUE to FALSE during the fourth clock cycle 522. The FALSE value of the ready signal 508 means that the third value 520 from the memory output gate (Q) 506 should be ignored and/or otherwise untrusted during a fourth clock cycle (i.e., current clock cycle=3, plus 1).

While the illustrated example of FIG. 5 indicates that a read operation of the third adjusted sample data 456 consumes two clock cycles (see span from the third clock cycle 516 through a fifth clock cycle 524), time delays that correspond to transient memory conditions may vary in other examples. As described above, in the event the time delay is extended then the corresponding current inrush per unit of time may be reduced. In this example, it is assumed that the transient conditions only occur during a single clock cycle, thus the example memory control circuitry 222 toggles the ready signal 508 to TRUE at the fifth clock cycle 524. As such, this signifies that a third value 526 (see DATA 3) of the memory output gate (Q) 506 can be trusted and/or is otherwise valid during the fifth clock cycle 524 (i.e., current clock cycle=4, plus 1). Toggling of the example ready signal 508 continue in this manner in response to instances where the example memory control circuitry 222 detects transitions from one sub-bank of memory to another.

While an example manner of implementing the memory control circuitry 222 of FIG. 1 is illustrated in FIG. 3, one or more of the elements, processes, and/or devices illustrated in FIG. 3 may be combined, divided, re-arranged, omitted, eliminated, and/or implemented in any other way. Further, the example architecture analysis circuitry 304, the example memory power circuitry 306, the example address mapper circuitry 308, the example inrush guard circuitry 310, the example data manager circuitry 302, the example signal processor circuitry 216, the example radar control circuitry 224, the example memory control circuitry 222 and/or, more generally, the example memory control circuitry 222 of FIG. 3, may be implemented by hardware alone or by hardware in combination with software and/or firmware. Thus, for example, any of the example architecture analysis circuitry 304, the example memory power circuitry 306, the example address mapper circuitry 308, the example inrush guard circuitry 310, the example data manager circuitry 302, the example signal processor circuitry 216, the example radar control circuitry 224, the example memory control circuitry 222 and/or, the example radar SoC 108, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example memory control circuitry 222 of FIG. 3 may include one or more elements, processes, and/or devices in addition to, or instead of, those illustrated in FIG. 3, and/or may include more than one of any or all of the illustrated elements, processes and devices.

Flowcharts representative of example machine readable instructions, which may be executed by programmable circuitry to implement and/or instantiate the memory control circuitry 222 of FIG. 3 and/or representative of example operations which may be performed by programmable circuitry to implement and/or instantiate the memory control circuitry 222 of FIG. 3, are shown in FIGS. 6-8. The machine-readable instructions may be one or more executable programs or portion(s) of one or more executable programs for execution by programmable circuitry such as the programmable circuitry 912 shown in the example processor platform 900 described below in connection with FIG. 9. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6-8, many other methods of implementing the example memory control circuitry 222 and more generally the radar SoC 108 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-8 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed, instantiated, and/or performed by programmable circuitry to reduce power consumption of radar memory operations. The example machine-readable instructions and/or the example operations 600 of FIG. 6 begin at block 602, at which the example transmit circuitry 202 transmits radar chirps. In some examples, the transmit circuitry 202 is instantiated by the example radar control circuitry 224 in response to a request for object detection, such as a request from the example ECU 106 of FIG. 1. The example receive circuitry 204 receives responses from the chirp signals (block 604) as (analog) radar information, and the example radar control circuitry 224 receives sample data (that has been digitized by the example ADCs 212) based on the received chirp responses (block 606*a*). In some examples, the generated sample data is stored in a memory in a first (e.g., a default) arrangement independent of any future signal analysis algorithm (block 606*b*). In some examples, the first sample data storage tasks store the sample data in a temporal arrangement as received during any number of transmitted chirps and corresponding receipts so that high-speed radar data gathering may occur. In some examples, the radar control circuitry 224 generates range FFT data prior to storage to the memory.

Because examples disclosed herein re-arrange stored sample data (or re-arrange stored processed radar data, such as range FFT data) from its originally stored arrangement to a revised arrangement that permits linear memory read tasks with relatively fewer memory sub-bank switching, the example architecture analysis circuitry 304 identifies an architecture of available memory (e.g., identify a number of memory banks, identify a number of sub-banks per memory bank, identify a bit width for memory storage, etc.) (block 608). Additionally, in an effort to conserve as much energy as possible, the memory power circuitry 306 places all sub-banks in a retention mode (block 610). The example memory control circuitry 222 waits for a request for sample data to be processed (block 612), such as a request by the example signal processor circuitry 216 to apply one or more signal analysis techniques (e.g., FFT algorithms, such as range FFT, Doppler FFT, etc.) to the generated sample data (e.g., assuming some such signal analysis techniques have not already been performed in-line) to produce processed radar data. In response to receiving a request to store the sample data into a revised arrangement (block 612), control advances to block 616 where the example memory control circuitry stores the sample data in a revised arrangement or second data structure arrangement (block 616), as described above and in further detail below. In response to receiving a request to read the sample data based on a particular signal processing algorithm (block 614), the example memory control circuitry 222 reads the sample data in a linear arrangement (block 618) (e.g., the first arrangement), as described above and in further detail below.

FIG. 7 illustrates additional detail corresponding to block 616 of FIG. 6 regarding storing sample data in a second arrangement (e.g., an alternate arrangement that is different than a default arrangement). In the illustrated example of FIG. 7, the example address mapper circuitry 308 identifies sets of sample data and/or processed radar data (e.g., including data that has been processed in-line to result in range FFT data) corresponding to chirps (block 702). Briefly returning to the illustrated example of FIG. 4, the address mapper circuitry 308 identifies a first set of sample data and/or processed radar data corresponding to Chirp #1 (e.g., see the first sub-bank 410 and the second sub-bank 412), Chirp #2 (e.g., see the third sub-bank 414), and any other available groups of sample data and/or processed radar data corresponding to chirps and their received reflections. The example address mapper circuitry 308 identifies, for each set of sample data and/or processed radar data, adjacent subsets of sample data and/or processed radar data that correspond to particular memory address ranges (block 704). For example, the address mapper circuitry 308 determines that a first sample 402 (e.g., corresponding to a first chirp) corresponds to a first memory range of [15:0], which is adjacent to a second sample 404 (e.g., corresponding to a second chirp) that corresponds to a second memory range of [31:16]), and so on. The example architecture analysis circuitry 304 determines a number of adjacent subsets or sample data and/or processed radar data that may fit in each memory sub-bank based on the memory bank architecture (block 706). In the illustrated example of FIG. 4, each sub-bank is capable of storing sixteen (16) samples, each 16-bits wide, but examples disclosed herein are not limited thereto. The address mapper circuitry 308 then selects a memory sub-bank of interest to begin rearranging (block 708).

The example address mapper circuitry 308 selects a chirp of interest (block 710), such as Chirp #1 in the event this is a first iteration through the program 616 of FIG. 7. During each iteration, the address mapper circuitry 308 selects a sequential subset value of sample data and/or processed radar data corresponding to the selected chirp of interest (block 712). For example, a first sequential subset value may include the first memory address range corresponding to all available chirps to be processed (e.g., bits [15:0]). As described above, this same memory address range is maintained when rearranging the sample data and/or processed radar data so that subsequent data read operations by one or more signal processing algorithms may occur in a linear fashion rather than a transposed fashion, thereby reducing an occurrence of memory time delays and, depending on an amount of settling time allocated to the memory power up, inrush current effects may be mitigated. The address mapper circuitry 308 stores the sequential subset of the sample data and/or processed radar data in an adjacent location of the memory sub-bank of interest (block 714) (e.g., the first adjusted sample 450 of the first sub-bank 410 as shown in the adjusted first memory bank 220*a*' of FIG. 4). The example architecture analysis circuitry 304 determines whether the selected memory sub-bank is full (block 716) and, if not the example address mapper circuitry 308 increments a chirp count value (e.g., increase the chirp count from 1 to 2) while maintaining the same sequential subset address range value (e.g., address range [15:0]) (block 718). Control returns to block 710.

On the other hand, in the event the selected memory sub-bank is full (block 716), then the architecture analysis circuitry 304 determines whether there are additional address ranges that still need to be rearranged (block 720). For example, if the previous series of iterations was focused on the address range of [15:0] corresponding to all available chirps, then the architecture analysis circuitry 304 determines if there is an adjacent address range (e.g., [31:16]) that still needs to be rearranged corresponding to all of the available chirps. If so, then the address mapper circuitry 308 resets the chirp count to 1 and increments the sequential subset address range value to the next adjacent address range (block 722) (e.g., instead of continuing to rearrange address ranges [15:0], move on to the adjacent address range of [31:16]). Additionally, the example address mapper circuitry 308 increments a memory sub-bank of interest to the next adjacent sub-bank (block 724). For example, now that the first sub-bank 410 is full, an adjacent second sub-bank 412 will be populated and/or otherwise rearranged. Control then returns to block 708. However, if all address ranges have been processed (block 720), control returns to block 602 of FIG. 6.

FIG. 8 illustrates additional detail corresponding to block 618 of FIG. 6 regarding reading sample data and/or processed radar data. In the illustrated example of FIG. 8, the example address mapper circuitry 308 identifies a memory sub-bank of interest corresponding to a sample data read request, such as a read request corresponding an FFT algorithm instantiated by the example signal processor circuitry 216 (block 802). The example memory power circuitry 306 activates power for the identified memory sub-bank while keeping the remaining sub-banks of memory in a retention mode (block 804). The example inrush guard circuitry 310 sets the ready signal 508 to FALSE (or a logical "0") (block 806) so that any memory output data for a subsequent clock cycle is ignored and/or otherwise deemed "junk." The inrush guard circuitry 310 determines whether transition conditions are satisfied (block 808), such as a threshold amount of time elapsing or a threshold number of clock cycles occurring to permit the sub-bank to achieve a stable and/or otherwise non-transient power-on condition. As described above, relatively longer threshold numbers of clock cycles allocated for bringing memory into a powered-on condition allow a relatively lower inrush current value to occur. If those conditions are not satisfied (block 808), the example program 618 waits for those conditions to be satisfied before setting the ready signal 508 to TRUE (or a logical "1") (block 810). The example address mapper circuitry 308 performs a read operation for the sample data and/or processed radar data in the identified memory bank of interest (block 812). The address mapper circuitry 308 determines whether that read operation corresponds to a last memory address for the current sub-bank (block 814) and, if not, returns to block 812 to perform another memory read of that same sub-bank in a linear manner. Stated differently, a number of consecutive memory read operations occur in a linear manner without any need to access an alternate sub-bank, thereby preventing any need to initiate a new power-up cycle (e.g., and corresponding inrush current) for a new sub-bank.

However, in the event the address mapper circuitry 308 determines that the most recent read operation corresponds to a last memory address of the selected sub-bank (block 814), the memory power circuitry 306 places the current memory sub-bank back into a retention mode to conserve power (block 816). The address mapper circuitry determines if there is additional sample data and/or processed radar data to read from other (e.g., additional adjacent) memory sub-banks (block 818) and, if so, control returns to block 802. However, if there is no further sample data and/or processed radar data to be read (block 818), then control returns to block 602 of FIG. 6.

Figure 9:
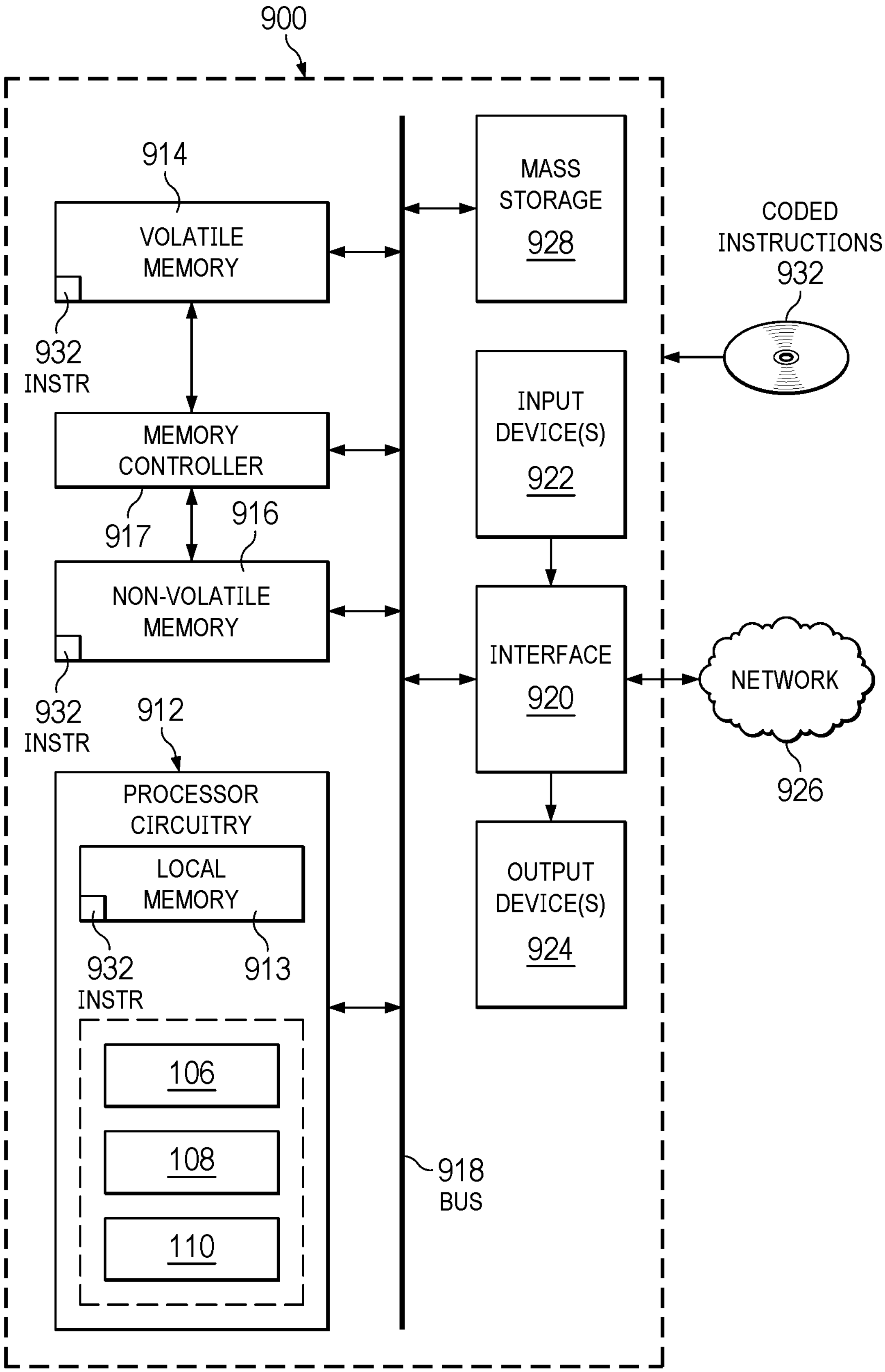
FIG. 9 is a block diagram of an example processing platform including programmable circuitry structured to execute, instantiate, and/or perform the example machine readable instructions and/or perform the example operations of FIGS. 6-8 to implement the Radar SoC of FIGS. 1-3.

FIG. 9 is a block diagram of an example programmable circuitry platform 900 structured to execute and/or instantiate the example machine-readable instructions and/or the example operations of FIGS. 6-8 to implement the radar SoC 108 of FIGS. 1-3. The programmable circuitry platform 900 can be, for example, a server, a personal computer, a workstation, a self-learning machine (e.g., a neural network), a mobile device (e.g., a cell phone, a smart phone, a tablet such as an iPad™), an Internet appliance, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the example memory control circuitry 222, the example architecture analysis circuitry 304, the example memory power circuitry 306, the example address mapper circuitry 308, the example inrush guard circuitry 310, the example data manager circuitry 302, the example radar control circuitry 224, the example signal processor circuitry 216, and the example radar SoC 108.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 932, which may be implemented by the machine readable instructions of FIGS. 6-8, may be stored in the mass storage device 928, in the volatile memory 914, in the non-volatile memory 916, and/or on at least one non-transitory computer readable storage medium such as a CD or DVD which may be removable.

It should be understood that some or all of the circuitry of FIG. 3 may, thus, be instantiated at the same or different times. For example, same and/or different portion(s) of the platform 900 of FIG. 9 may be programmed to execute portion(s) of machine-readable instructions at the same and/or different times.

In some examples, some or all of the circuitry of FIG. 3 may be instantiated, for example, in one or more threads executing concurrently and/or in series. For example, the microprocessor 900 of FIG. 9 may execute machine readable instructions in one or more threads executing concurrently and/or in series. Moreover, in some examples, some or all of the circuitry of FIG. 3 may be implemented within one or more virtual machines and/or containers executing on the microprocessor 900 of FIG. 9.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers, as used in the detailed description, do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero.

Modifications are possible in the described embodiments, and other embodiments are possible, within the scope of the claims.

From the foregoing, it will be appreciated that example systems, apparatus, articles of manufacture, and methods have been described that substantially reduce a power consumption of radar devices and/or radar operations. Examples disclosed herein facilitate a manner of sample data arrangement that reduces a frequency of memory sub-bank switching during successive memory read operations. As a result, because each memory sub-bank switching operation is associated with a corresponding inrush current event (e.g., a power drain) and corresponding time to wait for power transients to subside, examples disclosed herein conserve and/or otherwise reduce a power consumption of radar devices performing radar tasks (e.g., FFT signal processing). Further, in view of the energy savings and speed improvements caused by examples disclosed herein, described systems, apparatus, articles of manufacture, and methods are accordingly directed to one or more improvement(s) in the operation of a machine such as a computer or other electronic and/or mechanical device.

Example methods, apparatus, systems, and articles of manufacture to reduce power consumption of radar memory operations are disclosed herein. Further examples and combinations thereof include the following:

Example 1 includes a device comprising a memory that includes a first portion and a second portion, and memory control circuitry structured to receive a first set of data associated with a first radar chirp, receive a second set of data associated with a second radar chirp, store a first subset of the first set of data in the first portion of the memory as a first subset of sample data, store a first subset of the second set of data in the first portion of the memory as a second subset of sample data adjacent to the first subset of the first set of sample data, and store respective second subsets of the first and second sets of the sample data in the second portion of the memory.

Example 2 includes the device as defined in example 1, wherein the memory control circuit is structured to cause the second portion of the memory to operate in a retention mode when the first subsets of sample data are stored in the first portion of the memory.

Example 3 includes the device as defined in example 2, wherein the memory control circuit is structured to cause the first portion of the memory to operate in the retention mode in response to completing storage of the first subsets of sample data in the first portion of the memory, and cause an activation request message corresponding to the second portion of the memory.

Example 4 includes the device as defined in example 3, wherein the memory control circuit is structured to restrict at least one of read operations or write operations of the second portion of the memory in response to the activation request message.

Example 5 includes the device as defined in example 4, wherein the memory control circuit is structured to restrict the at least one of read operations or write operations for at least one of a predetermined amount of time or a predetermined number of clock cycles.

Example 6 includes the device as defined in example 3, wherein the memory control circuit is structured to permit at least one of a read operation or a write operation of the second portion of the memory after a delay period corresponding to the completion of storage in the first portion of the memory.

Example 7 includes the device as defined in example 1, wherein the memory control circuit is structured to initiate a read operation of one of the first portion or the second portion of the memory in response to a signal analysis algorithm request.

Example 8 includes the device as defined in example 7, wherein the memory control circuit is structured to permit the read operation after completion of an inrush current phase.

Example 9 includes the device as defined in example 1, wherein the first subset of sample data and the second subset of sample data include processed radar data.

Example 10 includes the device as defined in example 9, wherein the processed radar data includes Fast Fourier Transform (FFT) data.

Example 11 includes a system comprising transmit circuitry structured to produce a first radar chirp and a second radar chirp, receive circuitry structured to receive a first response to the first radar chirp and a second response to the second radar chirp, and generate first and second sets of sample data corresponding to respective ones of the received first response and second response, memory, and memory control circuitry structured to store a first portion of the first set of sample data in a first bank of the memory, and store a first portion of the second set of sample data in the first bank of the memory, the first portion of the second set of sample data adjacent to the first portion of the first set of sample data.

Example 12 includes the system as defined in example 11, further including signal processor circuitry structured to determine spatial characteristics corresponding to the stored first portions of the first and the second sets of sample data.

Example 13 includes the system as defined in example 12, wherein the signal processor circuitry is to determine the spatial characteristics as at least one of distance characteristics, speed characteristics, or angle characteristics.

Example 14 includes the system as defined in example 11, wherein the memory control circuitry is to cause storage of second portions of the first and second sets of sample data to a second bank of the memory.

Example 15 includes the system as defined in example 14, wherein the memory control circuitry is to cause a power save mode of the first bank of the memory during access operations of the second bank of the memory.

Example 16 includes the system as defined in example 14, further including memory power circuitry to restrict memory access to the second bank of the memory for a threshold period of time after a power-up request of the second bank of the memory.

Example 17 includes the system as defined in example 14, wherein the memory control circuitry is to toggle a ready signal to control a power state of the second bank of the memory.

Example 17 includes a method to receive radar chirps, respective ones of the radar chirps initially stored as first radar data samples adjacent to second samples, store a first one of the radar data samples corresponding to a first one of the respective ones of the radar chirps in a first memory portion adjacent to a first one of the samples corresponding to a second one of the respective ones of the radar chirps, and store a second one of the samples corresponding to the first one of the respective ones of the radar chirps in a second memory location adjacent to a second one of the radar data samples corresponding to the second one of the respective ones of the radar chirps.

Example 18 includes the method as defined in example 17, further including providing power to the first memory portion while restricting power to the second memory portion during memory access operations of the first samples.

Example 19 includes the method as defined in example 18, further including restricting power to the first memory portion and initiating a power-up routine for the second memory portion in response to access operations of the second samples.

Example 20 includes the method as defined in example 19, further including initiating an access delay time period after initiating the power-up routine for the second memory portion.

Example 21 includes the method as defined in example 20, wherein the access delay time period restricts access operations of the second memory portion for at least one clock cycle. The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. A device comprising:

a memory that includes a first portion and a second portion; and memory control circuitry structured to:

receive a first set of sample data associated with a first radar chirp;

receive a second set of sample data associated with a second radar chirp;

store a first subset of the first set of sample data in the first portion of the memory;

store a first subset of the second set of sample data in the first portion of the memory adjacent to the first subset of the first set of sample data; and store a second subset of the first set of sample data and a second subset of the second set of sample data in the second portion of the memory.

2. The device as defined in claim 1, wherein the memory control circuitry is structured to cause the second portion of the memory to operate in a retention mode when the first subset of the first set of sample data and the first subset of the second set of sample data are stored in the first portion of the memory.

3. The device as defined in claim 2, wherein the memory control circuitry is structured to:

cause the first portion of the memory to operate in the retention mode in response to completing storage of the first subset of the first set of sample data and the first subset of the second set of sample data in the first portion of the memory; and cause an activation request message corresponding to the second portion of the memory.

4. The device as defined in claim 3, wherein the memory control circuitry is structured to restrict at least one of read operations or write operations of the second portion of the memory in response to the activation request message.

5. The device as defined in claim 4, wherein the memory control circuitry is structured to restrict the at least one of read operations or write operations for at least one of a predetermined amount of time or a predetermined number of clock cycles.

6. The device as defined in claim 3, wherein the memory control circuitry is structured to permit at least one of a read operation or a write operation of the second portion of the memory after a delay period corresponding to the completion of storage in the first portion of the memory.

7. The device as defined in claim 1, wherein the memory control circuitry is structured to initiate a read operation of one of the first portion or the second portion of the memory in response to a signal analysis algorithm request.

8. The device as defined in claim 7, wherein the memory control circuitry is structured to permit the read operation after completion of an inrush current phase.

9. The device as defined in claim 1, wherein the first subset of the first set of sample data and the first subset of the second set of sample data include processed radar data.

10. The device as defined in claim 9, wherein the processed radar data includes Fast Fourier Transform (FFT) data.

11. A system comprising:

transmit circuitry structured to produce a first radar chirp and a second radar chirp;

receive circuitry structured to:

receive a first response to the first radar chirp and a second response to the second radar chirp; and generate first and second sets of sample data corresponding to respective ones of the received first response and second response;

memory; and memory control circuitry structured to:

store a first portion of the first set of sample data in a first bank of the memory; and store a first portion of the second set of sample data in the first bank of the memory, the first portion of the second set of sample data adjacent to the first portion of the first set of sample data.

12. The system as defined in claim 11, further including signal processor circuitry structured to determine spatial characteristics corresponding to the stored first portions of the first and the second sets of sample data.

13. The system as defined in claim 12, wherein the signal processor circuitry is to determine the spatial characteristics as at least one of distance characteristics, speed characteristics, or angle characteristics.

14. The system as defined in claim 11, wherein the memory control circuitry is to cause storage of second portions of the first and second sets of sample data to a second bank of the memory.

15. The system as defined in claim 14, wherein the memory control circuitry is to cause a power save mode of the first bank of the memory during access operations of the second bank of the memory.

16. The system as defined in claim 14, further including memory power circuitry to restrict memory access to the second bank of the memory for a threshold period of time after a power-up request of the second bank of the memory.

17. The system as defined in claim 14, wherein the memory control circuitry is to toggle a ready signal to control a power state of the second bank of the memory.

18. A method comprising:

receiving radar chirps;

storing each of the received radar chirps as first samples adjacent to second samples in an initial storage arrangement;

storing a first one of the samples corresponding to a first one of the respective ones of the radar chirps in a first memory portion adjacent to a first one of the samples corresponding to a second one of the respective ones of the radar chirps; and storing a second one of the samples corresponding to the first one of the respective ones of the radar chirps in a second memory portion adjacent to a second one of the samples corresponding to the second one of the respective ones of the radar chirps.

19. The method as defined in claim 18, further comprising providing power to the first memory portion while restricting power to the second memory portion during memory access operations of the first samples.

20. The method as defined in claim 19, further comprising restricting power to the first memory portion and initiating a power-up routine for the second memory portion in response to access operations of the second samples.

21. The method as defined in claim 20, further comprising initiating an access delay time period after initiating the power-up routine for the second memory portion.

22. The method as defined in claim 21, wherein the access delay time period restricts access operations of the second memory portion for at least one clock cycle.

* * * * *